I. LAMBORN.
Bee Hive.
No. 4,168.
Patented Aug. 26, 1845.
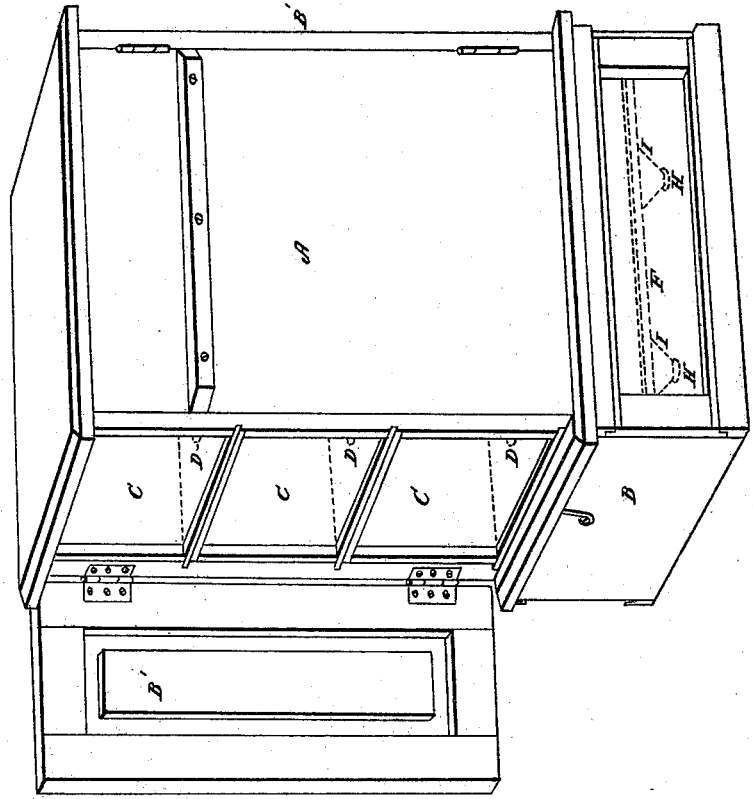
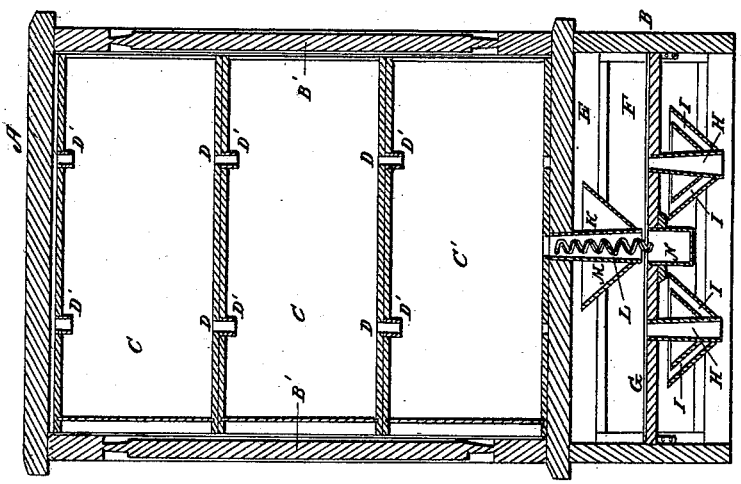

UNITED STATES PATENT OFFICE.

ISRAEL LAMBORN, OF MARSHALLTON, PENNSYLVANIA.

BEEHIVE.

Specification of Letters Patent No. 4,168, dated August 26, 1845.

*To all whom it may concern:*

Be it known that I, ISRAEL LAMBORN, of Marshallton, in the county of Chester and State of Pennsylvania, have invented a new and useful Improvement in Beehives, which is described as follows, reference being had to the annexed drawings of the same, making part of this specification.

Figure 1 is a vertical longitudinal section of the hive. Fig. 2 is a perspective view of ditto.

This bee hive consists of a rectangular box or case A, open on two opposite sides, being provided with doors B', on those sides and arranged in an upright position on a frame or table B, and containing a tier of boxes, C, resting and sliding, independently of each other, in grooves formed inside the case, in such a manner that one box can be drawn out of either of the open sides without interfering with the others, and perforated at top and bottom with openings D, to allow the bees to pass from one box to the other, the openings in the upper part of the boxes, containing tubes, D', which project below the upper board, and serve to prevent the moth from entering and passing through to the next box, by reason of their slippery or smooth surfaces.

A rectangular chamber E forming a reception room for the bees is formed, inside the frame or table B immediately below the case, having glass sides F, to enable the apiarian to see inside, which are covered when required by slides, and a horizontal bottom G, perforated with two apertures in each of which is placed a tube H, which extends down any required distance below the chamber, and through which the bees enter said chamber. These tubes may be of any suitable form either round, oval, or square and are each surrounded at their lower ends by two inverted truncated cones I secured at their lower ends to the lower part of the tubes, and designed to entrap the moth, the sides being on such a line of inclination that the moth can climb, which it is supposed she will do after failing to ascend through the tube, H, and as soon as she reaches the upper end of the lower inverted truncated cone she will fall over into the water contained in it. Should the moth again attempt to crawl up the outside of the upper inverted truncated cone she will meet the same fate and be deposited in the upper vessel of water.

After the bees pass through the tubes H into the reception room, they pass up through another tube K, extending from near the bottom of the lower chamber E, through the top of the chamber, into the lower box or drawer C', which tube K, contains a spiral wire L, which is wound round the inside of the tube from top to bottom, being secured firmly therein and is designed for the bees to light on in a swarm, and by their close contact impart their natural heat to the interior of the hive and to be ready as a convenient guard to protect the entrance against the inroad of the moth. This tube K, is also surrounded by an inverted truncated cone M, similar to those secured to the tubes H, in order to entrap the moth (should any enter the lower chamber by any means) as in the case of attemping to enter the chamber by way of the tubes.

A circular can or vessel N, for containing water, of the same diameter as the tubes or of any convenient diameter, is placed in an opening in the lower part of the chamber immediately below the tube, K, the top of which is open and even with the upper surface of the lower part of the chamber E, into which vessel of water the moth will be precipitated should she attempt to enter the hive by way of the coiled wire L; the space between the edge of the vessel and the wire being so great as to render it impossible for the moth to reach the wire. This vessel also serves as a receptacle for the filth of the hive.

What I claim as my invention and which I desire to secure by Letters Patent is—

1. The mode of preventing the moth from entering the hive, and entrapping her by means of the upright metallic tubes H, H, and inverted truncated cones I, forming the entrance to the reception room of the hive, and the upright tube K, forming a passage between the chamber and lower box, all of said tubes being surrounded by inverted truncated cones I, I, and M, containing water, and into which the moth is caused to fall as described.

2. I also claim combining with the vertical tube K, a spiral rest upon which the bees cluster, in the manner and for the purpose set forth.

ISRAEL LAMBORN.

Witnesses:
EDMUND MAHER,
WILLIAM ROMAN.